United States Patent [19]

McVeen

[11] 4,365,693

[45] Dec. 28, 1982

[54] HIGH VISIBILITY LIFT APPARATUS

[75] Inventor: Milford D. McVeen, Highland Heights, Ohio

[73] Assignee: Towmotor Corporation, Mentor, Ohio

[21] Appl. No.: 266,011

[22] PCT Filed: Oct. 3, 1980

[86] PCT No.: PCT/US80/01326

§ 371 Date: Oct. 3, 1980

§ 102(e) Date: Oct. 3, 1980

[87] PCT Pub. No.: WO82/01181

PCT Pub. Date: Apr. 15, 1982

[51] Int. Cl.$^3$ ............................................. B66B 9/20
[52] U.S. Cl. .................................. 187/9 E; 414/635; 254/386
[58] Field of Search .................. 187/9 E, 9 R, 95; 254/393, 385, 386, 277, 89 H, 93 R; 414/635, 630, 631, 641, 628, 629

[56] References Cited

U.S. PATENT DOCUMENTS

| | | | |
|---|---|---|---|
| 2,456,320 | 12/1948 | Repke | 187/9 E |
| 3,394,778 | 7/1968 | Brinton | 187/9 E |
| 4,030,568 | 6/1977 | Heinold | 187/9 E |
| 4,053,139 | 10/1977 | Lovaas | 254/393 |
| 4,191,276 | 3/1980 | Farmer et al. | 187/9 E |
| 4,219,302 | 8/1980 | Leskovec | 414/635 |

FOREIGN PATENT DOCUMENTS 1396715 6/1975 United Kingdom .............. 187/9 R

Primary Examiner—Joseph J. Rolla
Assistant Examiner—Kenneth Noland
Attorney, Agent, or Firm—William B. Heming

[57] ABSTRACT

Apparatus (10) for lifting or moving loads require high operator visibility and simplicity of construction. For example, in a mast assembly (10) such as can be used on a fork lift truck or other cargo handler it is desirable to maximize visibility through spaced-apart uprights (16,18,24,26). Also, free lift of a carriage (14) which engages the load will maximize visibility in that the movable uprights (16,18) will not be elevated above the fixed uprights (24,26) when raising the carriage (14) to move the load. In the apparatus (10), first and second lifting elements (32,34) or jacks (36,38) are mounted adjacent the uprights (16,24;18,26) for visibility. The lifting elements (32,34) are interconnected by a load sharing member (48) for free lift and to distribute the forces encountered in raising the load more equally between the lifting elements (32,34) and the chains (52', 52").

16 Claims, 2 Drawing Figures

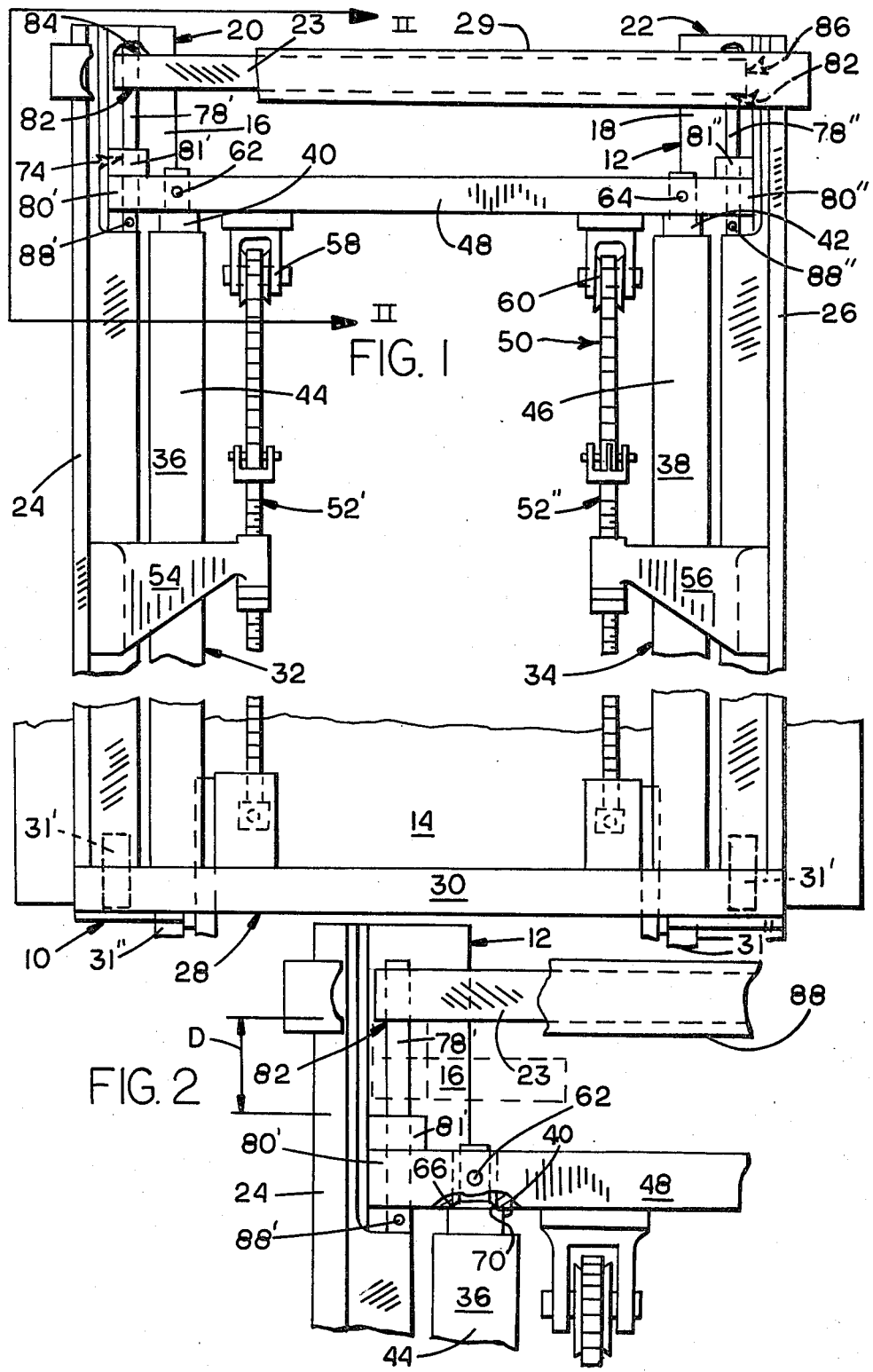

HIGH VISIBILITY LIFT APPARATUS

DESCRIPTION

1. Technical Field

The invention relates to load moving devices such as mast assemblies. More particularly, the invention relates to such devices using a pair of lifting elements to elevate the load.

2. Background Art

In the use of apparatus for lifting or moving loads, it is desirable to have high visibility through or about the structure while utilizing a simple and inexpensive design. For example, a common application of such apparatus is as the mast assembly for a fork lift truck or other material handler. The mast assembly generally contains two fixed uprights attached to the vehicle with a movable upright mounted on each of the fixed uprights by rollers. A carriage carrying load engaging forks is mounted for movement on the movable uprights. The movable uprights and carriage can be selectively elevated to retrieve or place loads as desired.

In such mast assemblies forward visibility of the operator is necessarily restricted by the uprights and carriage. Design involved in the addition of hydraulic jacks and chains which control the actual movement of the uprights and carriage is therefore critical, in that it is undesirable to further restrict the visibility or to add additional complicated structure or weight to the vehicle. One common solution for maintaining visibility between the uprights is to incorporate two hydraulic jacks each of which is positioned closely to one set of the movable and fixed uprights to minimize further interference with forward visibility. Such practices and one such solution are discussed in U.S. Pat. No. 2,456,320 which issued to E. P. Repke on Dec. 14, 1948. Another solution, utilizing only two hydraulic jacks, is disclosed in U.S. Pat. No. 4,030,568 which issued to L. K. Heinold on June 21, 1977.

It will be apparent that using two cooperating spaced-apart hydraulic jacks does create additional problems in that with an unevenly loaded carriage the jacks will experience unequal loading. Thus, if the jacks are rigidly and separately mounted to the frame or fixed uprights there will be undesirable bending or side loads on the jacks and uneven loading of the chains as the jacks extend toward the end of full travel.

Maneuverability of the vehicle can also be affected by the elevation of the movable uprights, which can be of particular importance while the lift truck is being driven to a storage location. If the movable uprights extend above the height of the fixed uprights, it will be understood that driving a vehicle where there is low clearance, such as through doorways, can result in interference with the movable uprights. Thus, it is desirable in a mast assembly to have free lift, which allows the carriage to be elevated for transportation of the load without extending the movable uprights above the fixed uprights. One such solution, which requires an additional cylinder between the uprights to separately elevate the carriage is shown in U.S. Pat. No. 3,394,778 which issued on July 30, 1968, to C. J. Brinton.

The present invention is directed to overcoming one or more of the problems set forth above.

DISCLOSURE OF INVENTION

In one aspect of the present invention, an apparatus has a frame, a first member mounted on and movable relative to said frame, and a second member mounted on and movable relative to said first member. First and second lifting elements are connected to the frame and each have a lifting or extendable portion movable between first and second positions. At the first positions, the second member is movable while the first member is free from being movable. At the second positions, said first and second members are both movable. A load sharing member is connected to the lifting portions of both lifting elements and is movable relative to the first member in response to at least one of the lifting portions moving from its first toward its second position. The load sharing member is movable with the first member in response to at least one of said lifting portions being at its second position.

In another aspect of the present invention, a mast assembly has first and second fixed uprights and first and second movable uprights mounted on and movable along the first and second fixed uprights. A carriage is mounted on and movable relative to said first and second movable uprights. A load sharing member is connected to lifting portions or rods of first and second jacks which have housing positions fixed relative to the fixed uprights. The load sharing member is movable with and in response to moving the jacks between their first positions at which said load sharing member is movable relative to the movable uprights and their second positions at which said load sharing member is movable with the movable uprights. A chain is connected to the carriage and one of the fixed uprights and passes about a sheave mounted to the load sharing member.

A mast assembly, such as for use on a lift truck or cargo handling device, utilizes the load sharing member to provide free lift in which the carriage moves without the movable uprights being moved. Such free lift facilitates easy transporting of loads while maintaining high visibility for an operator which might otherwise be hampered by elevated movable uprights or a separate jack to control only the carriage for free lift.

BRIEF DESCRIPTION OF THE DRAWINGS

FIG. 1 is a diagrammatic rear view of a mast assembly incorporating one embodiment of the present invention and as might be viewed when removed from, for example, a lift truck; and FIG. 2 is a diagrammatic view taken along line II—II and showing a portion of the mast assembly of FIG. 1 in greater detail.

BEST MODE FOR CARRYING OUT THE INVENTION

Referring to the drawings, apparatus 10 is shown which, for example, is a mast assembly, such as is used on a lift truck or container handling vehicle. The mast assembly, shown detached from the associated vehicle and as would be normally seen looking from the operator station of the vehicle, includes a first member, such as a movable upright assembly 12 and a second member, such as a carriage 14. As is known in the art, the movable upright assembly has first and second movable uprights 16,18 which are connected one to the other at their upper ends 20,22 by a cross member 23. The movable uprights are mounted on and movable relative to first and second fixed uprights 24,26, respectively which define a stationary frame 28. The fixed uprights, are spaced one from the other and are interconnected by a top support member 29 and a bottom support member 30. The movable uprights are movably mounted on the fixed uprights by rollers 31′ (two lower ones of which are shown in outline in FIG. 1), for example, as is commonly practiced in the art. Similarly, the carriage is mounted on and movable relative to the first and second movable uprights such as illustrated by lower rollers 31″ and engages loads to be carried on, for example, forks (not shown) connected thereto.

Movement of the movable upright assembly 12 and the carriage 14 is initiated and controlled through first and second lifting elements 32,34, shown as first and second jacks 36,38 which are hydraulically actuated single acting cylinders. Each of the jacks has a movable lifting portion or rod 40,42 and a stationary or housing portion 44,46. The housing portions are each fixed relative to the frame 28 by connection to the bottom support member 30. A load sharing member 48 is connected to and between the rods which are each controllably movable relative to their related housing portions between a first and second position. At their first or retracted positions, the carriage is movable and the movable upright assembly is free from being movable, and at their second, extended travel positions both the movable upright assembly and the carriage are movable. Jack operation, as by hydraulic controls, is well known in the art.

Means 50, such as a flexible tension member or chain 52, is provided for interconnecting the rod 40,42 of the jacks 36,38 and the carriage 14 for moving the carriage 14 through actuation of the jacks. The chains 52″,52″ are connected to the fixed uprights 24,26 through respective brackets 54,56 extending from said uprights across the jacks. Each of the chains passes about a sheave 58,60 connected to the load sharing member 48 and is connected to the carriage 14. It will be seen, therefore, that in response to moving at least one of the rods of the jacks, elevational movement of the carriage will be controlled. The chains can also be connected directly to the housing portions 44,46 of the jacks.

Referring more specifically to the construction of the load sharing member 48, pins 62,64 are positioned through respective rods 40,42 of the first and second jacks 36,38 and the load sharing member 48 to form a slightly loose connection between the jacks and the load sharing member. Each of said rods has a stepped end portion defining a seat 66 (one of which is shown in FIG. 2) which is positioned immediately adjacent and in contactable relationship with shoulders 70 on the load sharing member. The seats are preferably tapered or conical to be self-centering for maintaining full contact between the related seats and shoulders when said load sharing member is pivotly moved about the related one of the pins relative to its interconnected rod.

It will be seen that at an extended travel position of at least one of the rods 40,42, the load sharing member 48 will be urged into abutting engagement with the movable upright assembly 12. Guide means 74, such as a first guide pin 78′ and a first guide arm 80′, maintains preselected alignment of the load sharing member and the movable upright assembly in moving toward such engagement. The guide arm, which is shown as an integral portion of the load sharing member, has a sleeve portion positioned about and slidable along the pin in response to moving its related rod 40 between its retracted and extended positions. A second guide pin 78″ and guide arm 80″ are also shown associated with the opposite end of the load sharing member from the first pin and arm.

The engagement of the load sharing member and movable upright assembly results from contact between the guide arms through first and second bushings 81′,81″, each positioned loosely about a respective guide pin, and an engaging pad 82 divided between the two ends 84,86 or, alternately, brackets of the cross member 23. Further, stops 88′,88″, such as a cotter key or roll pin positioned transversely through each of the guide pins at their lowermost portions, are engageable by the load sharing member upon its downward travel.

Industrial Applicability

The mast assembly 10 is used to elevate loads supported by the carriage 14 for retrieval, transport and storage purposes. The present invention provides free lift of the carriage, in which the carriage is movable to raise a load, such as to an elevation required for driving an associated vehicle, while the movable uprights 16,18 are not moved above the level of the fixed uprights 24,26.

For example, the carriage 14 is shown at its lowermost travel position at which the rods 40,42 of the first and second jacks 36,38 are as fully retracted as is allowable relative to the maximum permissible carriage movement downwardly. Correspondingly, the movable uprights 16,18 rest upon the fixed uprights 24,26, such as through stops connected to and extending from the fixed uprights 24,26, which prevent the movable uprights 16,18 from extending below the fixed uprights 24,26. Also, the movable uprights do not extend above the fixed uprights in such retracted positions of the jacks. The load sharing member 48 is positioned a preselected distance D (FIG. 2) from the engaging pad 82 of the movable upright assembly 12. Such distance D defines one-half of the free lift of the carriage in that for each unit of travel of the sheaves 58,60 the carriage 14 moves two of such units. As will be described, movement of the load sharing member through a distance greater than said distance D will cause the movable upright assembly to be elevated above the fixed uprights 24,26.

The carriage 14 and movable uprights 16,18 are moved by activating the first and second jacks 36,38, which are preferably connected in parallel to a pressurized fluid source (not shown) such as a hydraulic pump. At the first or retracted positions (shown) of the rods 40,42 of the jacks, where the carriage is fully lowered, the carriage is movable through twice the preselected distance D by extending the rods to move the chains 52 past their respective sheaves 58,60 to, in effect, pull the carriage upwardly. The movable uprights remain stationary in that the rods 40,42 and the load sharing member 48 are free from any moving connection or engagement with said uprights. Thus, in response to raising the carriage 14 through its free lift distance, the load sharing member 48 is movable relative to the movable upright assembly 12 guided by the guide arms 80 moving freely along their respective guide pins 78.

At the second or extended travel position of the rods 40,42, shown in dashed lines in FIG. 2 and determined by movement through the preselected distance D, the guide arms 80 through the bushings 81 contact the engaging pad 82. The load sharing member is resultingly movable with the movable upright assembly upon further extension of the rods 40,42. The carriage also continues its elevational movement, as the load sharing member and movable upright assembly move one with the other, owing to the continuing upward movement of the sheaves 58,60 and the continuing movement of the chains 52 about their respective sheaves. The bushings 81, preferably of an elastomeric or plastic material, absorb shock and noise occurring during engagement of the guide arms and the engaging pad.

Lowering of the carriage is generally simply accomplished by retracting the jack rods 40,42 to let the force of gravity resultingly lower the movable upright assembly 12 which is resting upon the load sharing member 48. However, if the movable upright assembly 12 hangs up, the load sharing member through the guide arms 80',80" moves along the guide pins 78',78" until it engages the stops 88',88" at the lowermost portions of the guide pins. Further retraction of the rods pulls on the movable uprights 16,18 through the guide pins to break loose the movable upright assembly, or to correct a missequencing problem in which the movable uprights do not move downwardly together.

Not uncommonly, the load applied on the carriage 14 will not be centered and unequal forces will be exerted through the chains 52 before the jacks 36,38 are extended to initially move the carriage. For example, the parallel hydraulic connection between the jacks 36,38 maintains essentially equal fluid operating pressure in each one. Upon supply of pressurized fluid to the rods 40,42, the jack experiencing the least resistance through tension in its related chain tends initially to be the first to move, which motion causes the carriage 14 to cock to one side. Also, the load sharing member 48 partially moves about its connection to the rod of the jack not being extended. Unequal tension forces remain on the chains until the carriage rollers associated with the movable upright assembly 12 move transversely through the cocking motion a sufficient distance to engage the movable uprights 16,18 to develop lateral or side thrust loads in the rollers. Since the carriage can no longer cock, it will move upwardly with each unit of movement of the chain closest to the moving jack, causing equal movement of both of the chains at the carriage. Simultaneously, however, movement of the chains at their sheaves 58,60 is unequal owing to the continued pivotal movement of the load sharing member. The chain initially experiencing the highest forces, i.e. the chain closest to the jack not initially moving, therefore resultingly tends to experience reduced tension with the other chain experiencing increased tension. When the chains are equally loaded owing to the unequal movement of the jacks, and the force moment caused by the offset load on the carriage is wholly resisted by the lateral loads on the carriage rollers, the rods of the jacks will move together.

The load sharing member 48 thereby continuously attempts to equally distribute the load between the jacks 36,38 and maintain equal chain tension. It will be apparent therefore that the movable upright assembly is initially movable in response to only at least one of rods being extended, although the other side of the load sharing member will quickly contact the upright assembly owing to the small differential existing from the unequal rod movement.

Relative movement of the rods 40,42 is accommodated by the pins 62,64 and mating seats 66 and shoulders 70. Also, in the preferred embodiment, the jacks are mounted at their housing portions 44,46 through a flexible connection with the fixed uprights 24,26. This tends to facilitate unequal movements between the jacks. Such flexible mounting also frees the guide arms 80 and pins 78 from some of the loads encountered during operation and accommodates forces experienced by the jacks particularly at extended rod positions.

The mast assembly 10 as disclosed provides numerous desirable features particularly useful in lift trucks or cargo handlers. The load sharing member 48 permits the use of two hydraulic jacks nested in close proximity to the uprights 16,18 and 24,26 for maximum visibility around said uprights, such as where the jacks are mounted behind the uprights so as to not further interfere with an operator's forward line of sight. The load sharing member also maximizes free lift of the carriage 14 without any movement of the movable uprights 16,18 or the necessity for a separate jack for moving the carriage. The absence of their movement during free lift facilitates using longer movable uprights without any need to extend them relatively far below the bottom support member 30, which can interfere with unrestricted movement of the mast assembly 10.

Other aspects, objects and advantages will become apparent from a study of the specification, drawings and appended claims.

I claim:
1. Apparatus (10), comprising:
 a frame (28);
 a first member (12) mounted on and movable relative to said frame (28);
 a second member (14) mounted on and movable relative to said first member (12) and movable relative to said frame (28);
 first and second lifting elements (32,34) each having a movable lifting portion (40,42) and each being connected to said frame (28), said lifting portions (40,42) each being movable between a first position at which said second member (14) is movable thereby and said first member (12) is free from being movable and a second position at which said first and second members (12,14) are both movable thereby, and being movable one relative to the other;
 a load sharing member (48) connected to said lifting portions (40,42) of both of said first and second lifting elements (32,34) and being movable partially about each of said connections with said lifting portions (40,42) in response to relative movement of said lifting elements (32,34), and being movable relative to said first member (12) in response to at least one of said lifting portions (40,42) moving from its first position toward its second position and movable with said first member (12) in response to at least one of said lifting portions (40,42) being at its second position; and
 means (50) for interconnecting said first and second lifting elements (32,34) and said second member (14) for moving said second member (14) in response to moving at least one of said lifting portions (40,42) of said first and second lifting elements (32,34).

2. The apparatus (10), as set forth in claim 1, wherein said interconnecting means (50) includes a flexible tension member (52) connected to said frame (28) and to said second member (14).

3. The apparatus (10), as set forth in claim 2, including a sheave (58) connected to said load sharing member (48) and wherein said flexible tension member (52) passes about said sheave (58).

4. The apparatus (10), as set forth in claim 1, including guide means (74) for maintaining preselected alignment of said load sharing member (48) and said first member

(12) in response to moving said lifting portions (40,42) of said first and second lifting elements (32,34) between their first and second positions.

5. The apparatus (10), as set forth in claim 4, wherein said guide means (74) includes a guide pin (78) connected to said first member (12) and a guide arm (80) carried by said load sharing member (48) and positioned about and movable along said guide pin (78).

6. The apparatus (10), as set forth in claim 1, including pins (62,64) each positioned through a respective one of said lifting portions (40,42) of said first and second lifting elements (32,34) and through said load sharing member (48) and wherein partial movement of said load sharing member (48) is about said pins (62,64).

7. The apparatus (10), as set forth in claim 6, wherein each of said lifting portions (40,42) of said first and second lifting elements (32,34) has a seat (66) positioned immediately adjacent and in contactable relationship with said load sharing member (48) and forces exerted on said load sharing member (48) from said lifting portions (40,42) in moving said lifting portions (40,42) from their first toward their second positions are passed through said seats (66) onto said load sharing member (48).

8. A mast assembly (10), comprising:
a frame (28);
first and second fixed uprights (24,26) spaced one from the other and connected to said frame (28);
a movable upright assembly (12) having first and second movable uprights (16,18) mounted on and movable along said first and second fixed uprights (24,26), respectively;
a carriage (14) mounted on and movable relative to said first and second movable uprights (16,18);
first and second jacks (36,38) each having lifting (40,42) and housing (44,46) portions and being associated with said frist and second fixed uprights (24,26), respectively, said housing portions (44,46) each being substantially fixed relative to said first and second fixed uprights (24,26), said lifting portions (40,42) each being controllably movable between first and second positions relative to their respective related housing portion (44,46) and being movable one relative to the other;
a load sharing member (48) connected to said lifting portions (40,42) of said first and second jacks (36,38) and movable in response to moving said lifting portions (40,42), at said first positions of said lifting portions (40,42) said load sharing member (48) being movable partially about each of said connections with said lifting portions (40,42) in response to relative movement of said lifting portions (40,42) and movable relative to said movable upright assembly (12), and at said second positions of said lifting portions (40,42) said load sharing member (48) being engageable with said movable upright assembly (12) and said load sharing member (48) and said movable upright assembly (48) being movable one with the other;
a sheave (58) carried by said load sharing member (48); and
a chain (52) connected to a preselected one of said first and second fixed uprights (24,26) and to said carriage (14) and passing about said sheave (58).

9. The mast assembly (10), as set forth in claim 8, wherein said movable upright assembly (12) defines an engaging pad (82) and said load sharing member (48) is urged into contact with said engaging pad (82) at said second position of said load sharing member (48).

10. The apparatus (10), as set forth in claim 8, including pins (62,64) each positioned through a respective one of said lifting portions (40,42) of said first and second lifting elements (32,34) and through said load sharing member (48) and wherein said partial movement of said load sharing member (48) is pivotally about said pins (62,64).

11. The apparatus (10), as set forth in claim 8, wherein said lifting portions (40,42) seat with said load sharing member (48) for maintaining surface contact with said load sharing member (40) when said load sharing member (48) partially moves about its connections with said lifting portions (40,42).

12. The apparatus, as set forth in claim 8, including a guide pin (78) connected to said movable upright assembly (12) and a guide arm (80) carried by said load sharing member (48) and positioned about and movable along said guide pin (78).

13. The apparatus, as set forth in claim 12, including a stop (88) positioned on said guide pin (78) and wherein said guide arm (80) and said load sharing member (48) are located between said stop (88) and the connection of said guide pin (78) to said movable upright and wherein said load sharing member (48) is contactable with said stop (88) in response to moving said lifting portions (40,42) from their second toward their first positions.

14. Apparatus (10) comprising:
a frame (28);
a first member (12) mounted on and movable relative to said frame (28);
a second member (14) mounted on and movable relative to said first member (12) and movable relative to said frame (28);
first and second lifting elements (32,34) each having a movable lifting portion (40,42) and each being connected to said frame (28), said lifting portions (40,42) each being movable between a first position at which said second member (14) is movable thereby and said first member (12) is free from being movable and a second position at which said first and second members (12,14) are both movable thereby;
a load sharing member (48) connected to said lifting portions (40,42) of both of said first and second lifting elements (32,34) and being movable relative to said first member (12) in response to at least one of said lifting portions (40,42) moving from its first position toward its second position and movable with said first member (12) in response to at least one of said lifting portions (40,42) being at its second position.
means (50) for interconnecting said first and second lifting elements (32,34) and said second member (14) for moving said second member (14) in response to moving at least one of said lifting portions (40,42) of said first and second lifting elements (32,34); and
guide means (74) for maintaining preselected alignment of said load sharing member (48) and said first member (12) in response to moving said lifting portions (40,42) of said first and second lifting elements (32,34) between their first and second positions, said guide means (74) including a guide pin (78) connected to said first member (12) and a guide arm (80) carried by said load sharing member

(48) and positioned about and movable along said guide pin (78).

15. The apparatus (10), as set forth in claim 14, including pins (62,64) each positioned through a respective one of said lifting portions (40,42) of said first and second lifting elements (32,34) and through said load sharing member (48) and wherein said load sharing member (48) is movable about said pins (62,64).

16. The apparatus (10), as set forth in claim 14, wherein said guide arm (80) contacts said first member (12) at the second position of at least one of said lifting portions (40,42).

* * * * *